Aug. 29, 1933.   W. E. GRAY   1,924,604
DRAFT GEAR
Filed Aug. 29, 1930   2 Sheets-Sheet 1
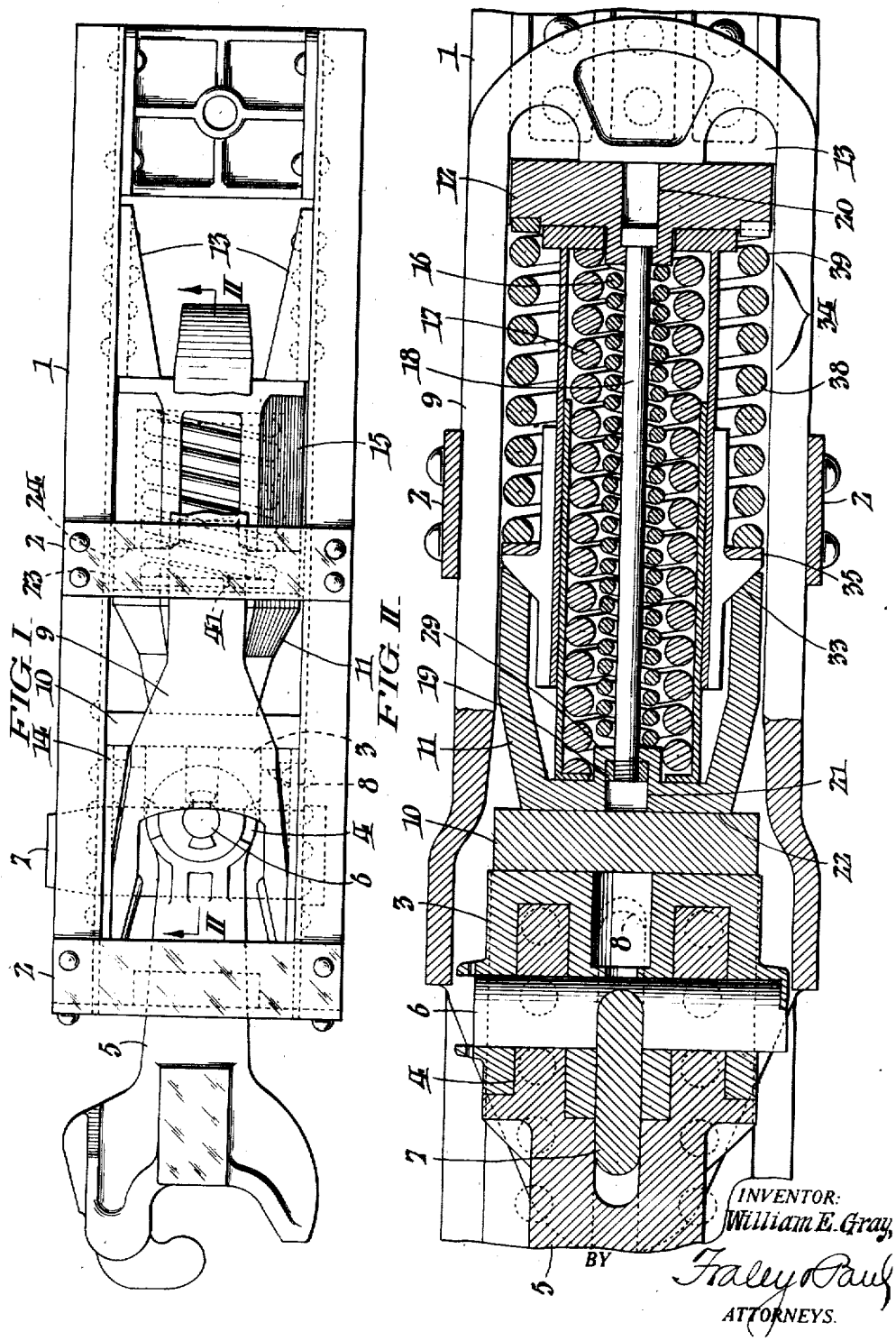
INVENTOR:
William E. Gray,
BY
Foley & Paul
ATTORNEYS.

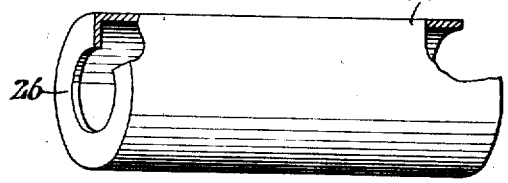
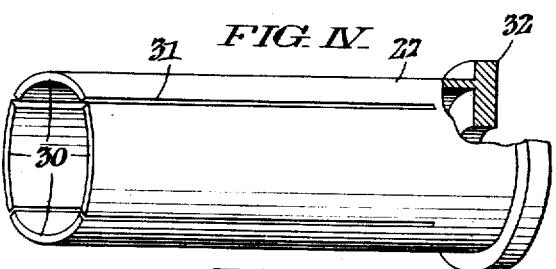
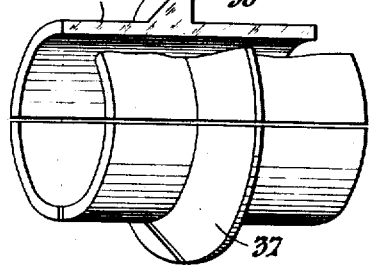
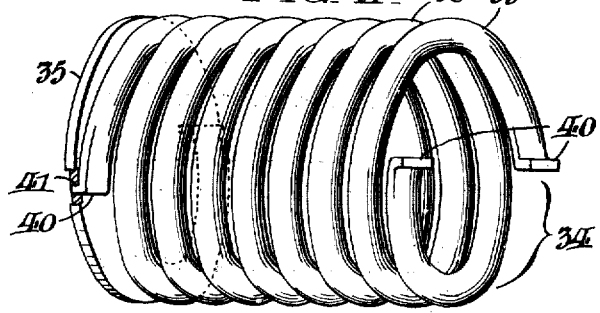
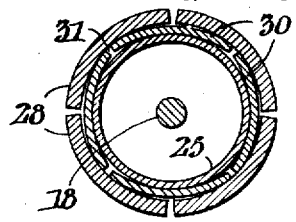

Patented Aug. 29, 1933

1,924,604

UNITED STATES PATENT OFFICE 1,924,604

DRAFT GEAR

William E. Gray, West Lafayette, Ind., assignor to The Pennsylvania Railroad Company, Philadelphia, Pa., a corporation of Delaware Application August 29, 1930. Serial No. 478,595

7 Claims. (Cl. 213—22)

My invention relates to draft gear for railway cars, locomotives or the like, and has particular relation to friction draft gear in which draft and buffing stresses are resisted by parts moving in frictional engagement.

One object of the invention is to provide in such a draft gear an arrangement of the constituent parts which permits the use of comparatively long release springs within the limited space available for draft gears on cars and locomotives, and thus results in a more positive release force. To this end, the friction parts are made in the form of inner and outer cylinders fitting one within another, the outer cylinder engaging the inner cylinder within creasing inward radial pressure as the gear closes together.

A further object of the invention is to increase the effective area of frictional contact for the dissipation of energy, and this is accomplished by movable friction shoes engaging the outer surface of the outer cylinder and causing the inner surface of the outer cylinder to engage, in turn, the outer surface of the inner cylinder. As the friction shoes and the inner cylinder move along the outer cylinder, the radial pressure compressing the outer cylinder between them increases, and this progressively increases the friction and hence the dissipation of energy.

A further object of the invention is to so form the friction cylinders that a variable area of peripheral contact may be obtained between their overlapping surfaces, the area of contact increasing with the closure of the draft gear.

A further object of the invention is to provide a friction spring of high capacity in comparison to diameter and size of wire, and this I accomplish by the use of interlocking coils maintained in proper position with respect to each other, and forming in effect a unit of double the capacity but of no greater length and size than a single coil.

A further object of the invention is to provide an inner friction cylinder having a continuous wall in co-operation with an overlapping outer friction cylinder divided by longitudinal slots into a plurality of sections adapted to be wedged into increasing frictional engagement with the inner cylinder.

Still other objects and advantages characterizing my invention will be evident from the description hereinafter of one embodiment or example of the invention, the description having reference to the accompanying drawings, whereof:

Fig. I represents a top plan view of the draft sills of a car with friction gear of my invention incorporated therein.

Fig. II represents an enlarged vertical cross-section of a portion of the same taken as indicated by the lines II—II of Fig. I.

Fig. III represents an enlarged perspective view of the inner cylindrical element of the draft gear.

Fig. IV represents an enlarged perspective view of the outer cylindrical element of the draft gear.

Fig. V represents an enlarged perspective view of the friction shoes of the draft gear.

Fig. VI represents an enlarged perspective view of the interlocking coils comprising the friction spring of the draft gear; and Fig. VII represents a cross-section of the inner and outer cylinders and friction shoes of the draft gear.

With reference to Fig. I, there is shown the draft sills 1 of a railway car comprising channels connected at intervals of their length by plates 2. Housed within the sills 1 there is a block 3 forming a pivotal mounting for the bifurcated end 4 of a drawer 5. A pivot pin 6 is inserted through the end of the drawbar 5 and the block 3, and the pin 6 is held in place by a transversely extending key 7 which engages a recess in the central portion of the pin 6. The key 7 also passes through slots 8 in a yoke member 9 which surrounds the draft gear. A buffing force applied to the drawbar 5 is communicated directly through the block 3 and a front follower 10 to the forward end of the housing 11 of the draft gear. A pulling force applied to the drawbar 5 is communicated through the block 3 and the key 7 to the forward end of the yoke 9, and the yoke 9 in turn extends rearwardly around the base 12 of the rear housing 15 of the draft gear, applying draft stresses at this point. Accordingly, a buffing force tends to move the follower 10 and housing 11 rearward while the rear housing 15 of the draft gear is held by stops 13, whereas a draft force tends to move the rear housing 15 of the draft gear forward while the follower 10 and housing 11 are held against movement by stops 14. The parts thus far referred to are of a common construction well known in the art and form no part of my invention, but merely illustrate an example of how the draft gear to be described may be applied to the center sills of a railway car.

The draft gear proper is confirmed between the two housings 11 and 15 which serve to enclose the working parts and hold them in proper relation. The housings 11 and 15 are held apart and urged against the front follower 10 and the yoke 9, respectively, by the pressure of release springs 16 and 17, the separation of the housings being limited by a retaining bolt 18 and nut 19. A recess 20 in the base 12 of the rear housing 15 accommodates the head of the retaining bolt 18, and a similar recess 21 in the base 22 of the housing 11 accommodates the nut 19, so that the housings may move together without the bolt 6 protruding when the gear is cushioning a blow. When the gear is fully closed the opposed faces 23 and 24 of housings 11 and 15 are in contact and take the oversolid blow, thus preventing damage to the interior parts.

The interior friction parts of the gear comprise an inner cylinder 25, shown in perspective in Fig. III, having at one end an inturned flange 26, an outer cylinder 27, shown in perspective in Fig. IV, and a plurality of friction shoes 28, shown in perspective in Fig. V. The inner cylinder 25 has a continuous wall, and is held concentric with the housing 11 by means of a projecting boss 29 thereon which fits within the circular opening in the end flange 26. The outer cylinder 27 fits closely over the inner cylinder 25 so that the two parts telescope in sliding frictional engagement as the gear closes. Furthermore, it will be apparent that release springs 16 and 17 are confined within the cylinders 25 and 27 and extend substantially to the end members 12 and 22 forming the bases of the rear and front housings. This arrangement permits the use of comparatively long release springs.

The outer cylinder 27, as shown in Fig. IV, is divided into flexible sections 30 of equal size by longitudinal slots 31 extending from the open end almost to the base 32. The friction shoes 28 are the same in number as the sections 30 of the outer cylinder 27. These shoes 28 encompass the outer cylinder 27 and are held in contact with the outer cylinder 27 and the inclined wedging face 33 of the front housing 11 by means of a friction spring 34 hereinafter described. The friction spring 34 bears upon a ring 35 which in turn bears upon flanges 36 of the friction shoes 28 and uniformly distributes the pressure exerted by the friction spring 34 upon all of the shoes 28.

In an obvious manner the inward radial pressure exerted by the wedging of the shoes 28 between the face 33 of the housing 11 and the outer cylinder 27 increases with the pressure exerted by the frictional spring 34, which in turn increases with the closure of the gear. The inclined face 33 of the forward housing 11 may be circular in contour or it may be polygonal, having a number of flat sides. In either case the wedging faces 37 of friction shoes 28 correspond in contour with the wedging face 33 of the housing 11.

In order to produce the necessary pressure for operation, within the limited space available, and to satisfactorily distribute the pressure on the friction shoes 28, the friction spring 34 is made of two identical coils 38 and 39, which are screwed into each other for their full length, as shown in Fig. VI. Accordingly, the coils 38 and 39 are interlocked and act together as a unit producing twice the pressure that a single coil would produce. In order to hold these coils in proper relation with each other, their tangs are bent at the ends to form small hooks 40. The hooks 40 of the separate coils 38 and 39 are accommodated in recesses 41 uniformly spaced in the ring 35 upon which spring 34 bears, and in the base 12 of the rear housing 15. Thus the coils are kept from turning with respect to each other and are maintained in proper relative position.

It will be evident from the description thus far that the pressure exerted upon the friction shoes 28 by the friction spring 34 against the wedging face 33 of the forward housing 11 causes an inward component of pressure directed against the outer cylinder 27. This inward radial pressure is communicated through the sections 30 of the outer cylinder 27 onto the inner cylinder 25, holding the friction shoes 28, outer cylinder 27, and inner cylinder 25 in intimate contact. The outer cylinder 27 being in end contact with the rear housing 15, and the friction shoes 28 and inner cylinder 25 being in end contact with the housing 11, the interfitting cylinders 27 and 25 and friction shoes 28 move over each other in sliding frictional engagement as the housings 11 and 15 move together during gear closure. The friction spring 34 is compressed as the gear closes, thus producing an increasing inward pressure on the friction parts as the housings 11 and 15 approach each other. As the friction parts are moving against this pressure they absorb energy and accomplish the principal object of all friction draft gears.

Release springs 16 and 17 are also compressed as the gear closes. As soon, however, as the closing force disappears, springs 16 and 17 tend to separate the housings 11 and 15 and relieve the wedging pressure on the shoes 28 to a certain extent. The release springs 16 and 17 return the housings and the inner and outer cylinders to their normal positions, whereas the friction spring 34 returns the friction shoes 28 to their normal position.

The characteristics of the reaction of the gear during closure may be modified by slightly crimping the sections 30 of the outer cylinder 27, as shown in Fig. VII, so that the sections are not circular arcs concentric with the continuous wall of the inner cylinder, but are flattened. As the result of crimping the sections 30 of the outer cylinder 27, the gear starts to close with a relatively small area of friction surface in contact with the inner cylinder 25; but as the inward pressure increases during gear closure, it forces the crimp out of sections 30 and brings them into more intimate contact with the inner cylinder 25.

The inner cylinder 25 is preferably formed with a comparatively thin wall. This permits a certain amount of distortion from its normal cylindric shape incident to inward pressure exerted by the outer cylinder 27, and thus prevents the building up of high peak reactions during gear closure.

It will be apparent from the above description that the construction and arrangement of parts permits the use of comparatively long release springs within the limited space available for draft gears on cars and locomotives, thus providing a more positive release force. Furthermore, the length of the release springs in the assembled gear is unaffected by wear of the friction parts, and hence the release force remains constant throughout the life of the gear. The peculiar design of the friction spring 34 permits it to be assembled under several inches of initial compression, which is sufficient to insure that the friction parts will remain tight throughout the life of the gear.

While I have described my invention in some detail and with reference to a specific embodiment thereof, it will be evident, especially to those skilled in this art, that various changes may be made in the form of the apparatus disclosed without departing from the spirit of the invention as defined in the appended claims, and it will also be evident that certain features of the invention may at times be used to advantage without a corresponding use of other features of the invention.

Having thus described my invention, I claim:

1. In a friction draft gear, relatively movable inner and outer cylinders, and friction means movable relatively to said outer cylinder, for wedging said outer cylinder against said inner cylinder with increasing inward radial pressure, said outer cylinder having flexible crimped sections separated by longitudinal slots, whereby the amount of peripheral contact between said inner and outer cylinders and between said outer cylinder and said movable frictional means is increased as said radial pressure increases.

2. In a friction draft gear, relatively movable inner and outer cylinders, and means, including friction shoes, for wedging said outer cylinder against said inner cylinder with increasing inward radial pressure, said outer cylinder having crimped sections distorted from cylindric shape, and said friction shoes having substantially cylindric faces engaging said crimped sections.

3. In a friction draft gear, inner and outer cylinders fitting one within another in sliding engagement, said outer cylinder being longitudinally slotted and having flexible crimped sections distorted from cylindric shape, housings at the ends of said cylinders, a spring resisting longitudinal movement of said cylinders towards each other, and means, including friction shoes movable relatively to said outer cylinder, engaging one of said housings and the sections of said outer cylinder in wedging contact, for pressing said crimped sections into frictional engagement with said inner cylinder with increasing radial pressure, whereby the area of contact between said crimped sections and inner cylinder is increased as said housings close together.

4. In a friction draft gear, relatively movable inner and outer cylinders, said outer cylinder having flexible crimped sections, said inner cylinder having a thin wall permitting its distortion from normal cylindric shape incident to inward pressure exerted by said outer cylinder, and means for wedging said cylinders together in sliding frictional contact.

5. In a friction draft gear, relatively movable inner and outer cylinders, said inner cylinder having a thin continuous wall permitting its distortion from normal cylindric shape incident to inward pressure exerted by said outer cylinder, said outer cylinder being longitudinally slotted to form a plurality of flexible crimped sections, friction shoes, and means for wedging said shoes against the sections of said outer cylinder with increasing pressure as said cylinders close together longitudinally.

6. In a friction draft gear, relatively movable friction parts, and means for urging said friction parts into intimate engagement, said means including a spring having interlocked coils with hooked ends, and a member recessed to accommodate said hooked ends in spaced relation.

7. In a friction draft gear, relatively movable friction parts, friction shoes for wedging said parts together, a spring having interlocked coils for urging said shoes into wedging engagement with said friction parts, and an annular member interposed between said spring and friction shoes, said spring coils having hooked ends engaged in spaced recesses in said annular member.

WILLIAM E. GRAY.

CERTIFICATE OF CORRECTION.

Patent No. 1,924,604.  August 29, 1933.

WILLIAM E. GRAY.

It is hereby certified that the State of Incorporation of the assignee in the above numbered patent was erroneously described and specified as "Delaware" whereas said State of Incorporation should have been described and specified as Pennsylvania as shown by the records of assignments in this office; page 1, line 15, for "within creasing" read with increasing; and that the said Letters Patent should be read with these corrections therein that the same may conform to the record of the case in the Patent Office.

Signed and sealed this 14th day of November, A. D. 1933.

F. M. Hopkins (Seal)  Acting Commissioner of Patents.

detail and with reference to a specific embodiment thereof, it will be evident, especially to those skilled in this art, that various changes may be made in the form of the apparatus disclosed without departing from the spirit of the invention as defined in the appended claims, and it will also be evident that certain features of the invention may at times be used to advantage without a corresponding use of other features of the invention.

Having thus described my invention, I claim:

1. In a friction draft gear, relatively movable inner and outer cylinders, and friction means movable relatively to said outer cylinder, for wedging said outer cylinder against said inner cylinder with increasing inward radial pressure, said outer cylinder having flexible crimped sections separated by longitudinal slots, whereby the amount of peripheral contact between said inner and outer cylinders and between said outer cylinder and said movable frictional means is increased as said radial pressure increases.

2. In a friction draft gear, relatively movable inner and outer cylinders, and means, including friction shoes, for wedging said outer cylinder against said inner cylinder with increasing inward radial pressure, said outer cylinder having crimped sections distorted from cylindric shape, and said friction shoes having substantially cylindric faces engaging said crimped sections.

3. In a friction draft gear, inner and outer cylinders fitting one within another in sliding engagement, said outer cylinder being longitudinally slotted and having flexible crimped sections distorted from cylindric shape, housings at the ends of said cylinders, a spring resisting longitudinal movement of said cylinders towards each other, and means, including friction shoes movable relatively to said outer cylinder, engaging one of said housings and the sections of said outer cylinder in wedging contact, for pressing said crimped sections into frictional engagement with said inner cylinder with increasing radial pressure, whereby the area of contact between said crimped sections and inner cylinder is increased as said housings close together.

4. In a friction draft gear, relatively movable inner and outer cylinders, said outer cylinder having flexible crimped sections, said inner cylinder having a thin wall permitting its distortion from normal cylindric shape incident to inward pressure exerted by said outer cylinder, and means for wedging said cylinders together in sliding frictional contact.

5. In a friction draft gear, relatively movable inner and outer cylinders, said inner cylinder having a thin continuous wall permitting its distortion from normal cylindric shape incident to inward pressure exerted by said outer cylinder, said outer cylinder being longitudinally slotted to form a plurality of flexible crimped sections, friction shoes, and means for wedging said shoes against the sections of said outer cylinder with increasing pressure as said cylinders close together longitudinally.

6. In a friction draft gear, relatively movable friction parts, and means for urging said friction parts into intimate engagement, said means including a spring having interlocked coils with hooked ends, and a member recessed to accommodate said hooked ends in spaced relation.

7. In a friction draft gear, relatively movable friction parts, friction shoes for wedging said parts together, a spring having interlocked coils for urging said shoes into wedging engagement with said friction parts, and an annular member interposed between said spring and friction shoes, said spring coils having hooked ends engaged in spaced recesses in said annular member.

WILLIAM E. GRAY.

CERTIFICATE OF CORRECTION.

Patent No. 1,924,604.    August 29, 1933.

WILLIAM E. GRAY.

It is hereby certified that the State of Incorporation of the assignee in the above numbered patent was erroneously described and specified as "Delaware" whereas said State of Incorporation should have been described and specified as Pennsylvania as shown by the records of assignments in this office; page 1, line 15, for "within creasing" read with increasing; and that the said Letters Patent should be read with these corrections therein that the same may conform to the record of the case in the Patent Office.

Signed and sealed this 14th day of November, A. D. 1933.

F. M. Hopkins (Seal)    Acting Commissioner of Patents.

CERTIFICATE OF CORRECTION.

Patent No. 1,924,604.  August 29, 1933.

WILLIAM E. GRAY.

It is hereby certified that the State of Incorporation of the assignee in the above numbered patent was erroneously described and specified as "Delaware" whereas said State of Incorporation should have been described and specified as Pennsylvania as shown by the records of assignments in this office; page 1, line 15, for "within creasing" read with increasing; and that the said Letters Patent should be read with these corrections therein that the same may conform to the record of the case in the Patent Office.

Signed and sealed this 14th day of November, A. D. 1933.

F. M. Hopkins (Seal)  Acting Commissioner of Patents.